United States Patent
Ahn et al.

(10) Patent No.: US 9,213,285 B2
(45) Date of Patent: *Dec. 15, 2015

(54) IMAGE FORMING APPARATUS AND CONTROL METHOD THEREOF

(71) Applicant: Samsung Electronics Co., Ltd, Suwon-si, Gyeonggi-do (KR)

(72) Inventors: Byeong Hwa Ahn, Seongnam-si (KR); Bong Hwan Choi, Suwon-si (KR); Yong Kon Jo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/267,269

(22) Filed: May 1, 2014

(65) Prior Publication Data

US 2014/0241774 A1 Aug. 28, 2014

Related U.S. Application Data

(63) Continuation of application No. 11/953,236, filed on Dec. 10, 2007, now Pat. No. 8,750,779.

(30) Foreign Application Priority Data

Feb. 1, 2007 (KR) ........................ 10-2007-0010657

(51) Int. Cl.
 *G03G 15/00* (2006.01)
 *B65H 85/00* (2006.01)
 (Continued)

(52) U.S. Cl.
 CPC ........... *G03G 15/231* (2013.01); *B41J 11/0095* (2013.01); *B41J 13/0036* (2013.01);
 (Continued)

(58) Field of Classification Search
 CPC . G03G 15/00; G03G 15/231; G03G 15/6529; B65H 85/00
 USPC ................................................. 399/401, 405
 See application file for complete search history.

(56) References Cited

U.S. PATENT DOCUMENTS

| 3,942,785 A | 3/1976 | Stange |
| 4,692,020 A | 9/1987 | Tsujihara |

(Continued)

FOREIGN PATENT DOCUMENTS

| EP | 0851310 | 7/1998 |
| JP | 60-12557 | 1/1985 |

(Continued)

OTHER PUBLICATIONS

Office Action issued in Korean Application No. 10-2007-0010657 on Apr. 22, 2013.

(Continued)

*Primary Examiner* — Nguyen Ha
(74) *Attorney, Agent, or Firm* — Staas & Halsey LLP (57) ABSTRACT

An image forming apparatus capable of increasing the speed of successively discharging printed printing media in order to increase the overall print speed and a control method thereof. The image forming apparatus includes a first discharge roller to feed printed printing medium rearward from a print unit disposed at an inner front portion of a main body, a reverse roller to reverse a moving direction of the printed printing medium fed from the first discharge roller from a rear to a front of the main body, a second discharge roller to discharge the printed printing medium whose moving direction is reversed outside, and an intermediate discharge roller unit which is provided between the first discharge roller and the reverse roller, the intermediate discharge roller unit including a main roller, a sub discharge roller and a sub supply roller which are in contact with the main roller. While a preceding printed printing medium fed from the reverse roller is discharged between the main roller and the sub discharge roller, a following printed printing medium fed from the first discharge roller is supplied between the main roller and the sub supply roller. Accordingly, since the interval between the preceding printed printing medium and the following printed printing medium becomes shorter than that of a conventional image forming apparatus, the speed of successively discharging printed printing media increases, and as a result the overall print speed increases.

25 Claims, 6 Drawing Sheets

(51) Int. Cl.
| | |
|---|---|
| *G03G 15/23* | (2006.01) |
| *B41J 11/00* | (2006.01) |
| *B41J 13/00* | (2006.01) |
| *B41J 13/02* | (2006.01) |
| *B41J 13/03* | (2006.01) |
| *B65H 15/00* | (2006.01) |
| *H04N 1/00* | (2006.01) |

(52) U.S. Cl.
CPC ............ *B41J13/0045* (2013.01); *B41J 13/025* (2013.01); *B41J 13/03* (2013.01); *B65H 15/00* (2013.01); *G03G 15/6529* (2013.01); *H04N 1/00567* (2013.01); *H04N 1/00591* (2013.01); *H04N 1/00612* (2013.01); *H04N 1/00631* (2013.01); *H04N 1/00657* (2013.01); *B65H 2301/3332* (2013.01); *B65H 2801/06* (2013.01)

(56) References Cited

U.S. PATENT DOCUMENTS

| | | | |
|---|---|---|---|
| 4,806,979 A | 2/1989 | Tokoro et al. | |
| 5,689,792 A | 11/1997 | Acquaviva et al. | |
| 6,145,834 A | 11/2000 | Hirota et al. | |
| 6,239,864 B1 | 5/2001 | Okamoto | |
| 6,304,743 B1 | 10/2001 | Fujii et al. | |
| 6,446,958 B1 | 9/2002 | Sette et al. | |
| 6,574,011 B1 | 6/2003 | Sato et al. | |
| 6,618,577 B2 | 9/2003 | Omura | |
| 6,798,430 B2* | 9/2004 | Sato | 347/115 |
| 7,146,113 B2* | 12/2006 | Kitamura | 399/13 |
| 7,493,062 B2* | 2/2009 | Igarashi | 399/111 |
| 7,603,049 B2 | 10/2009 | Kishi et al. | |
| 8,750,779 B2* | 6/2014 | Ahn et al. | 399/405 |
| 2002/0041781 A1* | 4/2002 | Yasui et al. | 399/391 |
| 2002/0054382 A1 | 5/2002 | Nanno | |
| 2005/0025544 A1* | 2/2005 | Yamashita et al. | 399/401 |
| 2006/0291898 A1* | 12/2006 | Ozawa et al. | 399/110 |
| 2007/0092320 A1 | 4/2007 | Taniguchi et al. | |
| 2009/0148214 A1 | 6/2009 | Gaman et al. | |

FOREIGN PATENT DOCUMENTS

| | | | | |
|---|---|---|---|---|
| JP | 60216346 | | 10/1985 | |
| JP | 62140969 | | 6/1987 | |
| JP | 03200663 | | 9/1991 | |
| JP | 09012200 | | 1/1997 | |
| JP | 2000321953 A * | 11/2000 | ............. G03G 15/00 |
| JP | 2001159835 A * | 6/2001 | ............. G93G 85/00 |
| JP | 2003-300642 | | 10/2003 | |
| JP | 2003-323100 | | 11/2003 | |
| JP | 2004-037685 | | 2/2004 | |
| JP | 2004-292150 | | 10/2004 | |
| JP | 2006-058459 | | 3/2006 | |
| JP | 2006256827 A * | 9/2006 | ............. G03G 15/00 |
| JP | 2007033711 A * | 2/2007 | ............. G03G 15/00 |
| KR | 10-2005-0110060 | | 11/2005 | |

OTHER PUBLICATIONS

European Search Report issued in EP 07124135.0 on May 28, 2008.
Office Action dated Dec. 7, 2010 from U.S. Appl. No. 11/953,236.
Office Action dated Apr. 26, 2011 from U.S. Appl. No. 11/953,236.
Office Action dated Nov. 14, 2011 from U.S. Appl. No. 11/953,236.
Office Action dated Aug. 10, 2012 from U.S. Appl. No. 11/953,236.
Office Action dated Feb. 27, 2013 from U.S. Appl. No. 11/953,236.
Office Action dated May 22, 2013 from U.S. Appl. No. 11/953,236.
Office Action dated Oct. 21, 2013 from U.S. Appl. No. 11/953,236.
Notice of Allowance dated Jan. 27, 2014 from U.S. Appl. No. 11/953,236.
U.S. Appl. No. 11/953,236, filed Dec. 10, 2007, Byeong Hwa Ahn, Samsung Electronics Co., Ltd.

* cited by examiner

IMAGE FORMING APPARATUS AND CONTROL METHOD THEREOF

CROSS-REFERENCE TO RELATED APPLICATIONS

This application is a Continuation Application of U.S. patent application Ser. No. 11/953,236, filed Dec. 10, 2007 in the U.S. Patent and Trademark Office, which claims priority under 35 U.S.C. §119(a) from Korean Patent Application No. 10-2007-0010657, filed on Feb. 1, 2007 in the Korean Intellectual Property Office, the disclosure of which is incorporated herein in its entirety by reference.

BACKGROUND OF THE INVENTION

1. Field of the Invention

The present general inventive concept relates to an image forming apparatus and a control method thereof, and more particularly to an image forming apparatus including a discharge unit to discharge printed papers successively and promptly and a control method thereof.

2. Description of the Related Art

Generally, an image forming apparatus, such as a printer, a copying machine, a fax machine, or a multi-function printer, includes a paper feeding unit, a print unit, and a paper discharge unit. The paper feeding unit supplies paper to the print unit, the print unit prints images on the supplied paper, and the paper discharge unit discharges the printed paper outside.

A conventional image forming apparatus is classified as a front-input-front-out (FIFO) type or a front-input-side-out (FISO) type according to a paper feeding direction and a paper discharging direction.

The FIFO type image forming apparatus is configured such that the paper is supplied from the front and discharged to the front. The paper discharge unit of the FIFO type image forming apparatus includes a first discharge roller which feeds the printed paper to the rear from the print unit disposed at the front portion of the image forming apparatus, a reverse roller which reverses the moving direction of the paper fed by the first discharge roller from the rear to the front, and a second discharge roller which discharges the printed paper, whose moving direction is reversed, outside.

However, in the conventional image forming apparatus having the above described paper discharge unit, the reverse roller rotates in a forward direction and in a reverse direction sequentially to completely discharge one sheet of printed paper outside. Therefore, when discharging the printed papers successively, the following sheet of printed paper to be discharged should stand by until the preceding sheet of printed paper completely leaves the reverse roller.

So as to successively discharge the preceding sheet of printed paper and the following sheet of printed paper without interference, the interval between two papers should be long. Accordingly, in order to prevent a decrease of the overall paper discharging speed (a print speed), the rotational velocity in the reverse direction of the reverse roller is set to be faster by 2~3 times more than the rotational velocity in the forward direction. However, in driving the reverse roller as described above, an operational noise of a driving motor increases. Further, a developing device of the print unit idles for a long span, and it results in toner stress and/or abrasion of a photosensitive drum. Accordingly, a lifespan of components reduces, and thus maintenance costs increase.

SUMMARY OF THE INVENTION

The present general inventive concept provides an image forming apparatus to increase a speed of successively discharging the printed printing media in order to increase an overall print speed.

The present general inventive concept provides a method to control the above image forming apparatus.

Additional aspects and/or utilities of the present general inventive concept will be set forth in part in the description which follows and, in part, will be obvious from the description, or may be learned by practice of the invention.

The foregoing and/or other aspects and utilities of the general inventive concept may also be achieved by providing an image forming apparatus including a first discharge roller to feed printed printing medium rearward from a print unit disposed at an inner front portion of a main body, a reverse roller to reverse a moving direction of the printed printing medium fed from the first discharge roller from a rear to a front of the main body, and a second discharge roller to discharge the printed printing medium whose moving direction is reversed outside, including an intermediate discharge roller unit which is provided between the first discharge roller and the reverse roller, the intermediate discharge roller unit including a main roller, a sub discharge roller and a sub supply roller which are in contact with the main roller. While a preceding printed printing medium fed from the reverse roller is discharged between the main roller and the sub discharge roller, a following printed printing medium fed from the first discharge roller is supplied between the main roller and the sub supply roller.

The image forming apparatus may further include a swing roller which is provided adjacent to the reverse roller to guide the printed printing medium fed from the first discharge roller to the second discharge roller.

When the rear end of the printed printing medium passes between the main roller and the sub supply roller, the swing roller may contact the reverse roller to reverse the moving direction of the printed printing medium, and when the rear end of the printed printing medium whose moving direction is reversed advances between the main roller and the sub discharge roller, the swing roller may move away from the reverse roller.

The swing roller may move away from the reverse roller before the following printed printing medium is fed to the main roller and the sub supply roller.

The image forming apparatus may further comprise a sensor to sense a rear end of the printed printing medium. A time required for the rear end of the preceding printed printing medium to advance between the main roller and the sub discharge roller of the intermediate discharge roller unit via the first discharge roller and the reverse roller after the rear end of the preceding printed printing medium is sensed by the sensor may be shorter than a time required for the following printed printing medium to advance between the main roller and the sub supply roller of the intermediate discharge roller unit.

If a time required for the rear end of the printed printing medium to pass between the main roller and the sub supply roller of the intermediate discharge roller unit after the rear end of the printed printing medium is sensed by the sensor may be 50 ms, an ascending time of the swing roller may be 100 ms, a descending time of the swing roller may be 100 ms, a process speed may be 150 mm/sec, and an interval between the printing media may be 75 mm, a distance between the reverse roller and the intermediate discharge roller unit may be 20 mm.

The foregoing and/or other aspects and utilities of the general inventive concept may also be achieved by providing a method to control an image forming apparatus including a printing medium discharge unit which includes a first discharge roller printed printing medium rearward from a print unit disposed at an inner front portion of a main body, a reverse roller to reverse a moving direction of the printed printing medium fed from the first discharge roller from a rear to a front of the main body, a second discharge roller to discharge the printed printing medium whose moving direction is reversed outside, and an intermediate discharge roller which is provided between the first discharge roller and the reverse roller and has a main roller, a sub discharge roller and a sub supply roller which are in contact with the main roller, and a sensor which is provided between the print unit and the first discharge roller to sense a rear end of the printed printing medium, including if the rear end of a preceding printed printing medium is sensed by the sensor, reversing the moving direction of the preceding printed printing medium by the reverse roller after lapse of a predetermined time, and if the preceding printed printing medium whose moving direction is reversed advances between the main roller and the sub discharge roller, advancing a following printed printing medium successively fed from the print unit between the main roller and the sub supply roller.

Also, a swing roller may be provided adjacent to the reverse roller to guide the printed printing medium fed from the first discharge roller to the second discharge roller, and the method may further include if the rear end of the printed printing medium passes between the main roller and the sub supply roller, contacting the swing roller to the reverse roller to reverse the moving direction of the printed printing medium, and if the rear end of the printed printing medium whose moving direction is reversed advances between the main roller and the sub discharge roller, making the swing roller move away from the reverse roller.

The swing roller may move away from the reverse roller before the following printed printing medium is fed to the main roller and the sub supply roller.

The foregoing and/or other aspects and utilities of the general inventive concept may also be achieved by providing an image forming apparatus including an intermediate discharge roller unit having a swing roller to move between a first position and a second position based on at least one or more predetermined time periods and a selected printing mode, and a reverse roller to interact with the swing roller in the second position to change a path of the printing medium.

The foregoing and/or other aspects and utilities of the general inventive concept may also be achieved by providing a method of successively transporting printing media in an image forming apparatus, the method including determining whether a rear end of a printing medium is detected and, if so, moving a swing roller to interact with a reverse roller after a predetermined time period to reverse a moving direction of the printing medium, and determining whether the redirected printing medium advances to an intermediate discharge roller unit and, if so, moving the swing roller away from the reverse roller, and advancing a following printing medium successively fed from a print unit to the intermediate discharge roller unit.

The foregoing and/or other aspects and utilities of the general inventive concept may also be achieved by providing a computer-readable recording medium having embodied thereon a computer program to execute a method, wherein the method includes determining whether a rear end of a printing medium is detected and, if so, moving a swing roller to interact with a reverse roller after a predetermined time period to reverse a moving direction of the printing medium, and determining whether the redirected printing medium advances to an intermediate discharge roller unit and, if so, moving the swing roller away from the reverse roller, and advancing a following printing medium successively fed from a print unit to the intermediate discharge roller unit.

The foregoing and/or other aspects and utilities of the general inventive concept may also be achieved by providing an image forming apparatus including a main body, an image forming unit disposed in the main body to form an image on a print medium and feed the print medium in a direction, a discharge unit disposed on a discharging path of the main body to discharge the print medium to an outside of the main body in a discharge direction and an intermediate discharge roller unit disposed between the image forming unit and the discharge until to first receive a leading edge of the printing medium from the image forming unit and to first feed a trailing edge of the printing medium toward the discharge unit.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures. In the following description, it will be explained that the present general inventive concept is applied to the laser printer capable of color printing and duplex printing, however the present general inventive concept is not restricted thereto. The present general inventive concept can also be applied to other types of image forming apparatuses, e.g., an ink-jet printer, a multi-function printer, a copying machine, and the like, through adequate changes or modifications.

Figure 1:
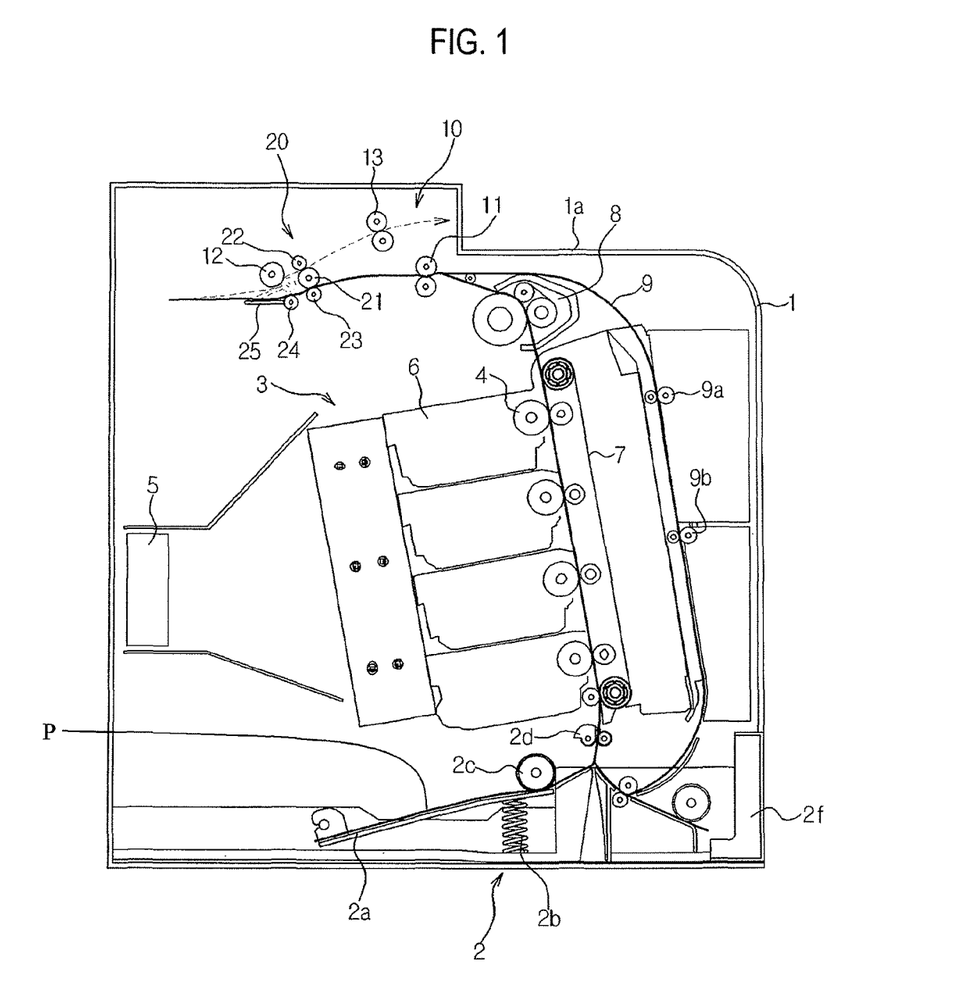
FIG. 1 is a sectional view illustrating an image forming apparatus in accordance with the present general inventive concept.

FIG. 1 is a sectional view illustrating an image forming apparatus in accordance with the present general inventive concept. As illustrated in the drawing, the image forming apparatus according to the present general inventive concept includes a main body 1 which forms an exterior appearance, a printing medium feeding unit 2 which is mounted to a lower portion of the main body 1 and can be pulled to a front of the image forming apparatus to supply printing media such as paper to be printed, a print unit 3 which is provided at an inner front portion of the main body 1 to print color images on the papers supplied from the printing medium feeding unit 2, and a printing medium discharge unit 10 which discharges the printed papers outwardly to a front exterior of the main body 1.

The printing medium feeding unit 2 includes a printing medium tray 2a on which the papers P are loaded, and a spring 2b to elastically support the printing medium tray 2a. The papers P loaded on the printing medium tray 2a are picked up by a pickup roller 2c sheet by sheet and are moved to the print unit 3 through a register roller 2d. A manual printing medium feeding tray 2f is provided at the front portion of the main body 1, on which one or more sheets of paper can be swiftly loaded as needed.

The print unit 3 includes exposure and developing devices 5 and 6 to form a color toner image (e.g., yellow, magenta, cyan and black) on a photosensitive drum 4, a transfer device 7 to transfer the toner image formed on the photosensitive drum 4 to the paper, and a fixing device 8 to fix the toner image by applying heat pressure to the paper. Typically, the above devices 5 to 8 are unitarily provided, respectively, for convenient maintenance and repair. Especially, the exposure device 5 is disposed at the inner rear portion of the main body 1, and the developing device 6, the transfer device 7, and the fixing device 8 are disposed at an inner front portion of the main body 1.

The print unit 3, the transfer device 7, the fixing device 8, and/or the return unit 9 may constitute an image forming unit to form an image on a printing medium and to feed the printing medium toward the discharge unit 10. The printing medium discharge unit 10 feeds the printed paper, which has passed through the fixing device 8, to a discharge tray 1a which is provided at an upper front portion of the main body 1. The printing medium discharge unit 10 includes a plurality of discharge rollers 11, 12 and 13.

Figure 2:
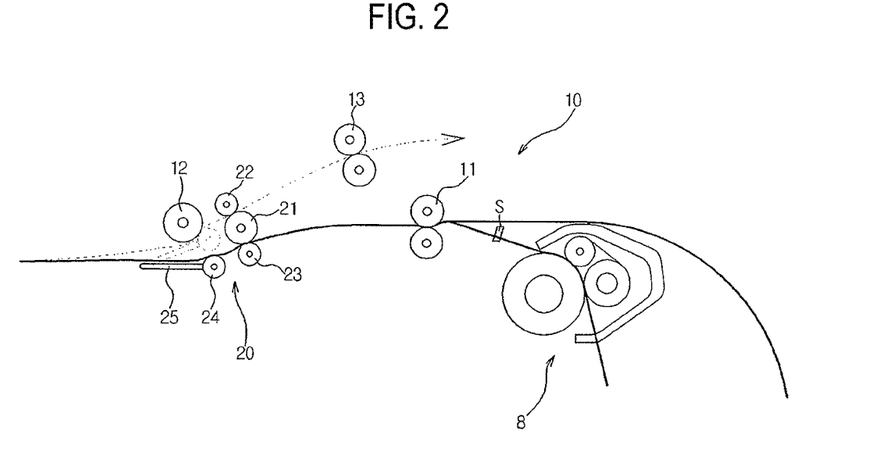
FIG. 2 is a schematic view illustrating a printing medium discharge unit of an image forming apparatus in accordance with the present general inventive concept.

FIG. 2 is a schematic view illustrating the printing medium discharge unit of the image forming apparatus in accordance with the present general inventive concept. Referring to FIG. 2, the printing medium discharge unit 10 includes a first discharge roller 11 which is provided adjacent to the fixing device 8 to discharge the printed paper, a reverse roller 12 to reverse a moving direction of the paper fed from the first discharge roller 11, and a second discharge roller 13 to discharge the paper fed from the reverse roller 12 outside. The first discharge roller 11 and the second discharge roller 13 respectively include a pair of unit rollers.

In order to discharge the printed paper to the front of the main body 1, the reverse roller 12 is provided at the inner rear portion of the main body 1, and the first discharge roller 11 and the second discharge roller 13 are provided at the inner front portion of the main body 1. The second discharge roller 13 is disposed above the first discharge roller 11. In other words, the moving direction of the printed paper from the first discharge roller 11 to the reverse roller 12 is opposite to the moving direction of the printed paper from the reverse roller 12 to the second discharge roller 13.

Also, an intermediate discharge roller unit 20 is provided between the first discharge roller 11 and the reverse roller 12. The intermediate discharge roller unit 20 includes a main roller 21 to generate a driving force, a sub discharge roller 22 and a sub supply roller 23 which are in contact with the main roller 21 to be rotated by the driving force of the main roller 21. The positions of the sub discharge roller 22 and the sub supply roller 23 are determined according to the moving direction of the printed paper fed from the first discharge roller 11 to the second discharge roller 13 via the reverse roller 12. Accordingly, the sub discharge roller 22 and the sub supply roller 23 are disposed such that the moving direction of the printed paper passing between the main roller 21 and the sub supply roller 23 is opposite to the moving direction of the printed paper passing between the main roller 21 and the sub discharge roller 22. The intermediate discharge roller unit 20 is located adjacent to the reverse roller 12, the detailed description of which will be made later.

Further, a swing roller 24 is provided adjacent to the reverse roller 12. The swing roller 24 functions to guide the paper fed from the first discharge roller 11 to the second discharge roller 13 when the reverse roller 12 rotates in the reverse direction. The swing roller 24 is connected to a lever 25 which is pivotably provided, so that the swing roller 24 swings by the lever 25 and selectively comes into contact with the reverse roller 12.

Meanwhile, as illustrated in FIG. 1, the image forming apparatus may further include a return unit 9 to perform duplex printing in the main body 1. Before the printing medium which is printed on one surface is completely discharged from the printing medium discharge unit 10, the return unit 9 feeds the paper to a paper return path, which is separately provided in the main body, when the reverse roller 12 rotates in the reverse direction, so that the paper passes again through the print unit 3 via the paper return path and is printed on the other surface. The return unit 9 includes a plurality of duplex rollers 9a and 9b that are located on the paper return path.

Hereinafter, the operation of the image forming apparatus according to the present general inventive concept structured as above will be described with reference to FIGS. 3 to 5. A sensor S is provided between the fixing device 8 (FIG. 2) of the print unit 3 and the first discharge roller 11 to sense the rear end of the paper. If the sensor S senses a rear end of the paper, the reverse roller 12 rotates in the reverse direction when a predetermined time t1 elapses.

Referring to FIGS. 1 and 2, if an image signal is input to the image forming apparatus to perform the print operation, the paper P1 loaded on the printing medium tray 2a is picked up by the pickup roller 2c, and the toner image is formed on the paper P1 while the paper P1 passes through the print unit 3. While the paper passes through the fixing device 8, the toner image is fixed to the paper.

Referring to FIGS. 2-5, after passing through the fixing device 8, the printed paper passes through the first discharge roller 11. At this time, the sensor S senses the rear end of the printed paper P1. The timing of rotating the reverse roller 12 in the reverse direction is determined according to a printing mode selected such as single-sided printing or duplex printing. For example, in the single-sided printing mode, the reverse roller 12 rotates in the reverse direction after the paper passes through the first discharge roller 11. Alternatively, in the duplex printing mode, the reverse roller 12 rotates in the reverse direction before the paper passes completely through the first discharge roller 11. In the following description, only the single-sided printing will be described.

Figure 3:
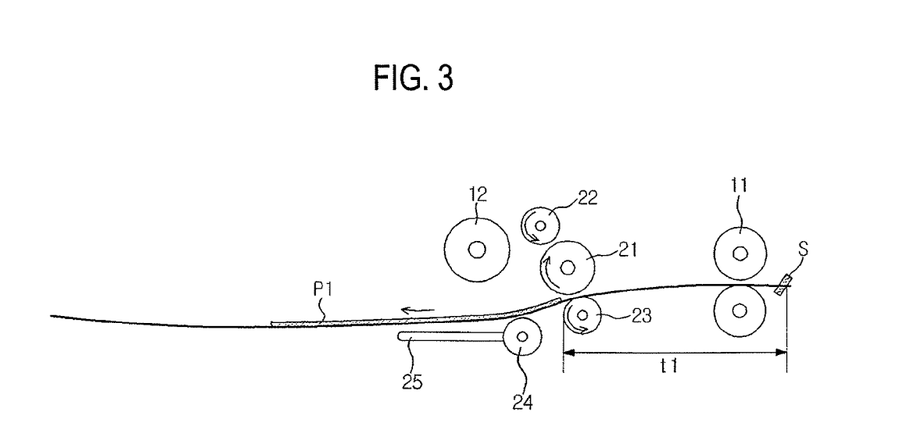
FIGS. 3 to 5 are views illustrating a printing medium discharging operation of an image forming apparatus in accordance with the present general inventive concept.

Referring to FIG. 3, after the sensor S senses the rear end of the printed paper P1 having passed through the first discharge roller 11, the printed paper P1 moves for the predetermined time t1. For the predetermined time t1, the printed paper P1 passes between the main roller 21 and the sub supply roller 23 of the intermediate discharge roller unit 20. The time t1 is stored in the image forming apparatus in advance, which is calculated from the moving speed and the moving distance of the printed paper.

Figure 4:
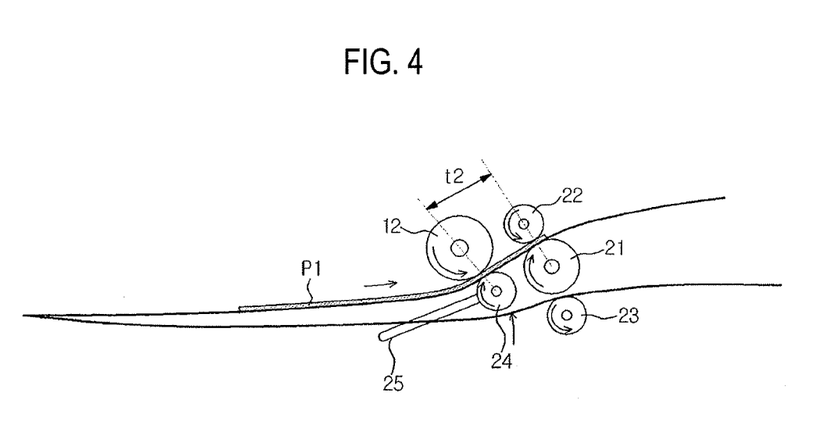

Referring to FIGS. 2 and 4, the reverse roller 12 operates in advance to prepare to reverse the moving direction of the printed paper P1. That is, when the time t1 elapses, the swing roller 24 comes into contact with the reverse roller 12 to reverse the moving direction of the printed paper P1, and accordingly the rear end of the printed paper P1 advances between the main roller 21 and the sub discharge roller 22 of the intermediate discharge roller unit 20. A time t2 required for the printed paper P1 to arrive at the intermediate discharge roller unit 20 from the reverse roller 12 is stored in the image forming apparatus in advance, which is calculated from the moving speed of the printed paper and the distance between the reverse roller 12 and the intermediate discharge roller unit 20.

Figure 5:
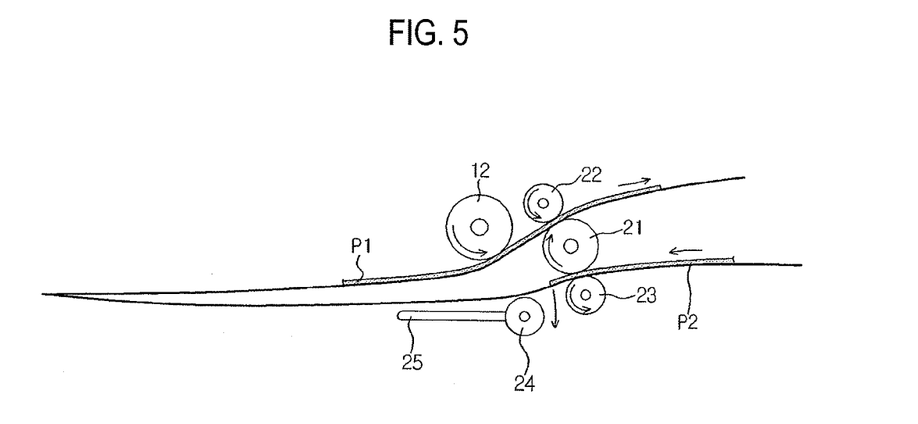

Referring to FIG. 5, when the printed paper P1 advances between the main roller 21 and the sub discharge roller 22 after the predetermined time t2 elapses, the swing roller 24 moves away from the reverse roller 12 and returns to its original position. At this time, the front end of the following sheet of printed paper P2 advances between the main roller 21 and the sub supply roller 23 of the intermediate discharge roller unit 20.

The advance of the following sheet of printed paper P2 into the intermediate discharge roller unit 20 is determined from the predetermined interval between the preceding sheet of printed paper and the following sheet of printed paper. For instance, the interval between the preceding sheet of printed paper P1 and the following sheet of printed paper P2 may be calculated from the total time T which sums up the above described time t1 and t2 and the time required for the swing roller 24 to contact and move away from the reverse roller 12 and the moving speed of the printed paper.

That is, by regulating the above described time T required to move the preceding sheet of printed paper P1 and the time required for the following sheet of printed paper P2 to arrive the intermediate discharge roller unit 20, the discharge of the preceding sheet of printed paper P1 from the intermediate discharge roller unit 20 and the advance of the following sheet of printed paper P2 into the intermediate discharge roller unit 20 can be performed at the same time. Because the interval between the preceding sheet of printed paper P1 and the following sheet of printed paper P2 becomes shorter than that of the conventional image forming apparatus, the overall speed of successively discharging the printed papers increases.

The operation of the image forming apparatus according to the present general inventive concept will be further described based on the experimental results. The experiment was made under the conditions that the process speed is 150 mm/sec and the interval between the papers is 75 mm (500 ms).

After the sensor S senses the rear end of the preceding sheet of printed paper P1, the time required for the rear end of the preceding sheet of printed paper P1 to pass between the main roller 21 and the sub supply roller 23 of the intermediate discharge roller unit 20 is 50 ms. At this time, the reverse roller 12 operates in advance to prepare to reverse the moving direction of the printed paper P1.

After the lapse of 50 ms, the swing roller 24 swings upward for 100 ms and comes into contact with the reverse roller 12 to reverse the moving direction of the preceding sheet of printed paper P1. Then, the rear end of the preceding sheet of printed paper P1 advances between the main roller 21 and the sub discharge roller 22 of the intermediate discharge roller unit 20.

After the lapse of 200 ms, the swing roller 24 swings downward for 100 ms to move away from the reverse roller 12 and returns to its original position.

Accordingly, the total time required for the rear end of the preceding sheet of printed paper P1 to advance between the main roller 21 and the sub discharge roller 22 of the intermediate discharge roller unit 20 is 450 ms (50+100+200+100=450). Because the interval between the preceding sheet of printed paper P1 and the following sheet of printed paper P2 is 500 ms, the front end of the following sheet of printed paper P2 advances between the main roller 21 and the sub supply roller 23 while the preceding sheet of printed paper P1 arrives between the main roller 21 and the sub discharge roller 22. The front end of the preceding sheet of printed paper P1 passes through the reverse roller 21 before the rear end of the following sheet of printed paper P2 passes through the intermediate discharge roller unit 20.

Figure 6:
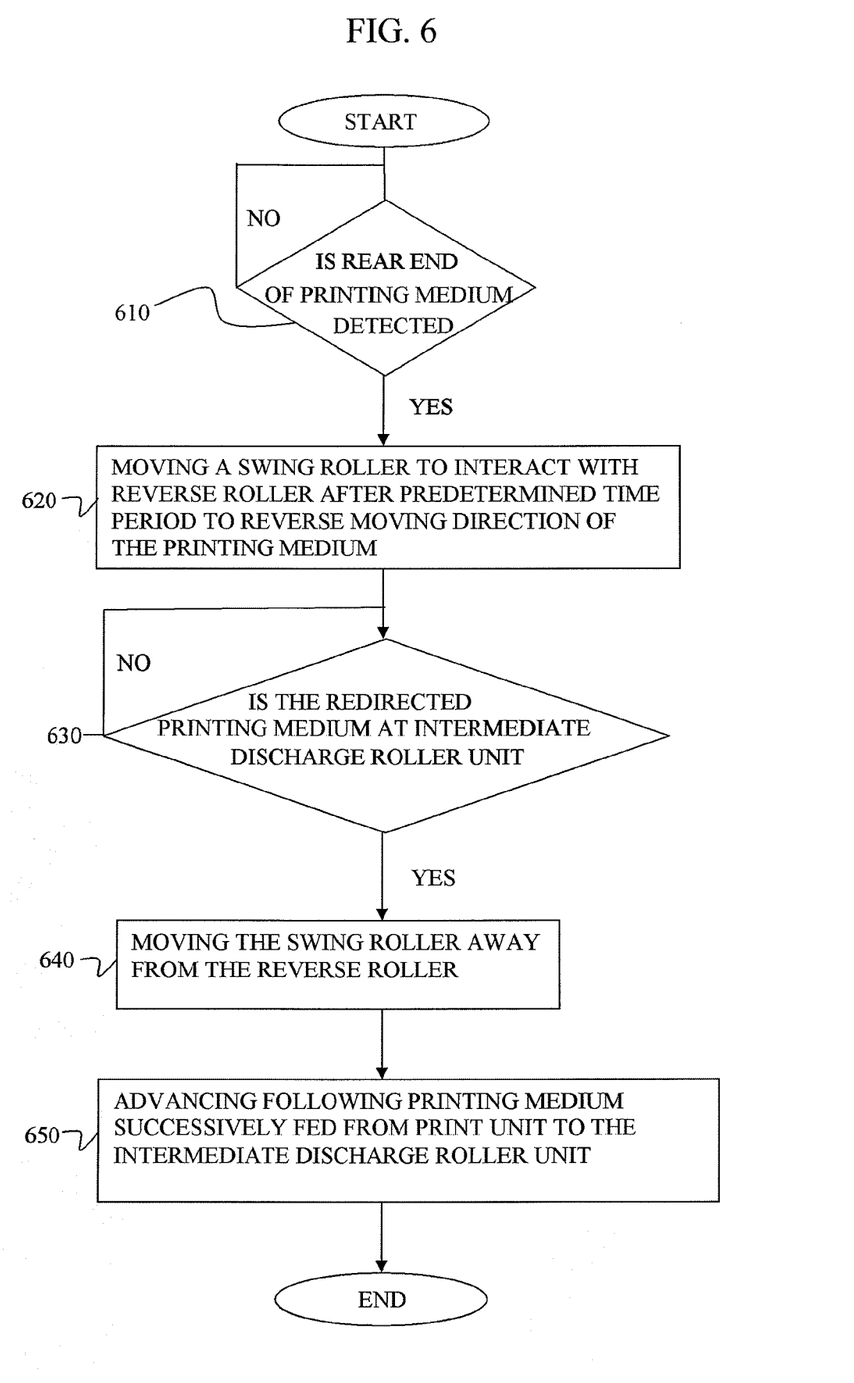
FIG. 6 is a flowchart illustrating a method of successively transporting printing media in an image forming apparatus according to an exemplary embodiment of the present general inventive concept.

FIG. 6 is a flowchart illustrating a method of successively transporting printing media in an image forming apparatus according to an exemplary embodiment of the present general inventive concept. Referring to FIG. 6, in operation 610, a determination is made as to whether a rear end of a printing medium is detected. If so, in operation 620, a swing roller moves to interact with a reverse roller after a predetermined time period to reverse a moving direction of the printing medium. In operation 630, a determination is made as to whether the redirected printing medium advances to an intermediate discharge roller unit. If so, in operation 640, the swing roller is moved away from the reverse roller. In operation 650, a following printing medium successively fed from a print unit is advanced to the intermediate discharge roller unit.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As apparent from various embodiments of the image forming apparatus according to the present general inventive concept is equipped with the intermediate discharge roller unit between the first discharge roller and the reverse roller so that the discharge of the preceding sheet of printed paper from the printing medium discharge unit and the supply of the following sheet of printed paper into the printing medium discharge unit can be performed at the same time. Accordingly, the interval between the preceding sheet of printed paper and the following sheet of printed paper decreases, and thus the overall print speed increases.

Although various embodiments of the present general inventive concept have been illustrated and described, it would be appreciated by those skilled in the art that changes may be made without departing from the principles and spirit of the general inventive concept, the scope of which is defined in the claims and their equivalents.

What is claimed is:

1. An image forming apparatus, comprising:
a main body having a discharge tray provided at a front portion of the main body;
a print unit to perform a printing operation on a printing medium, the print unit including a plurality of developing devices, a transfer belt arranged between the plurality of developing devices and a front panel of the main body, and a fixing device;
a first discharge roller to feed the printed printing medium fed from the print unit;
a reverse roller to reverse a moving direction of the printed printing medium fed from the first discharge roller;
a second discharge roller to discharge the printed printing medium fed from the reverse roller to the discharge tray of the main body;
a first feeding path extending upward between the plurality of developing devices and the transfer belt, the first feeding path extending to be inclined toward a rear portion of the main body;
a second feeding path connected to the first feeding path and extending toward the reverse roller;
a discharge path connected to the second feeding path to guide the printing medium reversed by the reverse roller toward the discharge tray, at least one portion of the discharge path disposed above the second feeding path such that the reversed printing medium is fed upward toward the discharge tray;
a duplex-print circulation path provided between the transfer belt and the front panel of the main body to feed the printing medium to the print unit; and
a sensor provided between the fixing device of the print unit and the reverse roller to sense a portion of the printing medium,
wherein, in a duplex printing mode, after a printing operation is performed on a first side of a printing medium and a moving direction of the printing medium engaged by the reverse roller is reversed, the reversed printing medium is fed to the duplex-print circulation path to perform a printing operation on a second side of the printing medium,
wherein, in the duplex printing mode, after the printing operation is performed on the second side of the printing medium, the printing medium is fed by the first discharge roller to the reverse roller, and a moving direction of the printing medium is reversed by the reverse roller, the reversed printing medium is discharged to the discharge tray via the second discharge roller, and
wherein, in the duplex printing mode, when a predetermined time elapses after the sensor senses the portion of the printing medium, the moving direction of the printing medium is reversed by the reverse roller.

2. The image forming apparatus according to claim 1, further comprising:
a swing roller to swing upward to interact with the reverse roller.

3. The image forming apparatus according to claim 2, further comprising:
an intermediate discharge roller unit which is provided on a path between the first discharge roller and the second discharge roller, the intermediate discharge roller unit including a main roller, a sub discharge roller and a sub supply roller which are in contact with the main roller,
wherein the swing roller swings upward to contact the printed printing medium to the reverse roller to guide the printed printing medium fed from the first discharge roller to the second discharge roller, and
wherein when a rear end of the printed printing medium passes through between the main roller and the sub supply roller, the swing roller contacts the printed printing medium to the reverse roller to reverse the moving direction of the printed printing medium, and when the rear end of the printed printing medium whose moving direction is reversed advances between the main roller and the sub discharge roller, the swing roller moves away from the reverse roller.

4. The image forming apparatus according to claim 3,
wherein while a preceding printed printing medium fed from the reverse roller is discharged between the main roller and the sub discharge roller, a following printed printing medium fed from the first discharge roller is supplied between the main roller and the sub supply roller, and
wherein the swing roller moves away from the reverse roller before the following printed printing medium is fed to between the main roller and the sub supply roller.

5. The image forming apparatus according to claim 4, wherein the portion of the printing medium sensed by the sensor corresponds to a rear end of the printed printing medium.

6. The image forming apparatus according to claim 5, wherein:
a time required for the rear end of the printed printing medium to pass between the main roller and the sub supply roller of the intermediate discharge roller unit after the rear end of the printed printing medium is sensed by the sensor is approximately 50 ms,
an ascending time of the swing roller is approximately 100 ms,
a descending time of the swing roller is approximately 100 ms, and
a process speed is approximately 150 mm/sec.

7. The image forming apparatus according to claim 1, wherein the first discharge roller is provided between the fixing device and the reverse roller to feed the printing medium fed from the print unit.

8. A method to control an image forming apparatus including a main body having a discharge tray provided at a front portion of the main body, a print unit to perform a printing operation on a printing medium and including a plurality of developing devices and a transfer belt arranged between the plurality of developing devices and a front panel of the main body, and a printing medium discharge unit including a first discharge roller to feed the printed printing medium rearward from the print unit, a reverse roller to reverse a moving direction of the printed printing medium fed from the first discharge roller from a rear to a front of the main body, a second discharge roller to discharge the printed printing medium to an outside of the main body, a first feeding path extending upward between the plurality of developing devices and the transfer belt, a second feeding path connected to the first feeding path and extending toward the reverse roller, and a discharge path connected to the second feeding path to guide the printing medium reversed by the reverse roller toward the discharge tray, the method comprising:
in a duplex printing mode, after a printing operation is performed on a first side of a printing medium and a moving direction of the printing medium engaged by the reverse roller is reversed, feeding the printing medium to a duplex-print circulation path provided between the transfer belt and the front panel of the main body and configured to feed the printing medium to the print unit such that a printing operation is performed on a second side of the printing medium; and in the duplex printing mode, after the printing operation is performed on the second side of the printing medium and the moving direction of the printing medium engaged by the reverse roller is reversed, discharging the printing medium to the discharge tray via the second discharge roller, wherein the first feeding path extends to be inclined toward a rear portion of the main body and at least one portion of the discharge path is disposed above the second feeding path such that the reversed printing medium is fed upward toward the discharge tray.

9. The method according to claim 8, wherein a swing roller is provided adjacent to the reverse roller to guide the printed printing medium fed from the first discharge roller to the second discharge roller, and an intermediate discharge roller unit is further provided on a path between the first discharge roller and the second discharge roller, the intermediate discharge roller unit including a main roller, a sub discharge roller and a sub supply roller which are in contact with the main roller, and the method further comprises:

if the rear end of the printed printing medium passes through between the main roller and the sub supply roller, controlling the swing roller to contact the printed printing medium to the reverse roller to reverse the moving direction of the printed printing medium; and if the rear end of the printed printing medium whose moving direction is reversed advances between the main roller and the sub discharge roller, making the swing roller move away from the reverse roller.

10. The method according to claim 9, wherein the swing roller moves away from the reverse roller before the following printed printing medium is fed to the main roller and the sub supply roller.

11. An image forming apparatus, comprising:

a main body having a discharge tray provided at a front portion of the main body;

a print unit to perform a printing operation on a printing medium, the print unit including a plurality of developing devices and a transfer belt arranged between the plurality of developing devices and a front panel of the main body;

a reverse roller to change a feeding path of the printing medium;

a first discharge roller located to feed the printing medium toward the reverse roller;

a second discharge roller to discharge the printing medium fed from the reverse roller to the discharge tray of the main body;

a first feeding path extending upward between the plurality of developing devices and the transfer belt, the first feeding path extending to be inclined toward a rear portion of the main body;

a second feeding path connected to the first feeding path and extending toward the reverse roller; and a discharge path connected to the second feeding path to guide the printing medium reversed by the reverse roller toward the discharge tray, at least one portion of the discharge path disposed above the second feeding path such that the reversed printing medium is fed upward toward the discharge tray, wherein, in a duplex printing mode, after a printing operation is performed on a first side of the printing medium and a moving direction of the printing medium engaged by the reverse roller is reversed, the printing medium is fed to a duplex-print circulation path provided between the transfer belt and the front panel of the main body and configured to feed the printing medium to the print unit such that a printing operation is performed on a second side of the printing medium, and wherein, in the duplex printing mode, after the printing operation is performed on the second side of the printing medium and the moving direction of the printing medium engaged by the reverse roller is reversed, the printing medium is discharged to the discharge tray via the second discharge roller.

12. The apparatus of claim 11, further comprising:

a swing roller to swing upward between a first position and a second position; and a sensor disposed between the reverse roller and a fixing unit to sense the printing medium, wherein the swing roller moves from the first position to the second position and interacts with the reverse roller based on a first predetermined time period after the sensor senses the printing medium.

13. The apparatus of claim 12, further comprising:

a main roller and a sub discharge roller provided on a path between the reverse roller and the second discharge roller, wherein the swing roller moves to the first position away from the reverse roller based on a second predetermined time period corresponding to an amount of time for the printing medium to arrive from the reverse roller to between the reverse roller and the second discharge roller.

14. The apparatus of claim 13, further comprising:

a sub supply roller provided on a path between the reverse roller and the first discharge roller, wherein a front end of a preceding printing medium passes through the reverse roller before a rear end of a following printing medium passes through the sub supply roller.

15. An image forming apparatus, comprising:

a main body having a discharge tray provided at a front portion of the main body;

a print unit to perform a printing operation on a printing medium, the print unit including a plurality of developing devices and a transfer belt arranged between the plurality of developing devices and a front panel of the main body;

a reverse roller provided at a rear portion of the main body to reverse a moving direction of the printed printing medium;

a first discharge roller to receive the printed printing medium from the print unit and to feed the printed printing medium in a direction from the front portion to the rear portion;

a second discharge roller to discharge the printed printing medium fed from the reverse roller to the discharge tray of the main body in a direction from the rear portion to the front portion;

a first feeding path extending upward between the plurality of developing devices and the transfer belt, the first feeding path extending to be inclined toward a rear portion of the main body;

a second feeding path connected to the first feeding path and extending toward the reverse roller; and a discharge path connected to the second feeding path to guide the printing medium reversed by the reverse roller toward the discharge tray, at least one portion of the discharge path disposed above the second feeding path such that the reversed printing medium is fed upward toward the discharge tray, wherein, in a duplex printing mode, after a printing operation is performed on a first side of a printing medium and a moving direction of the printing medium engaged by the reverse roller is reversed, the reversed printing medium is fed to a duplex-print circulation path provided between the transfer belt and the front panel of the main body and configured to feed the printing medium to the print unit to perform a printing operation on a second side of the printing medium, wherein, in the duplex printing mode, after the printing operation is performed on the second side of the printing medium and the moving direction of the printing medium engaged by the reverse roller is reversed, the reversed printing medium is discharged to the discharge tray via the second discharge roller, and wherein, before the printing medium is reversed by the reverse roller, the printing medium is transferred from the reverse roller toward a rear portion of the main body, and when the printing medium is reversed by the reverse roller and discharged from the reverse roller, the printing medium is directed toward the front portion of the main body.

16. The image forming apparatus according to claim 15, further comprising:
    a swing roller to swing upward to interact with the reverse roller;
    an intermediate discharge roller unit which is provided on a path between the first discharge roller and the second discharge roller, the intermediate discharge roller unit including a main roller, a sub discharge roller and a sub supply roller which are in contact with the main roller,
    wherein the swing roller swings upward to contact the printed printing medium to the reverse roller to guide the printed printing medium fed from the first discharge roller to the second discharge roller, and
    wherein when a rear end of the printed printing medium passes through between the main roller and the sub supply roller, the swing roller contacts the printed printing medium to the reverse roller to reverse the moving direction of the printed printing medium, and when the rear end of the printed printing medium whose moving direction is reversed advances between the main roller and the sub discharge roller, the swing roller moves away from the reverse roller.

17. The image forming apparatus according to claim 15, further comprising:
    a sensor disposed between the print unit and the first discharge roller to sense an end of the printed printing medium.

18. The image forming apparatus according to claim 15, further comprising:
    an intermediate discharge roller unit including a main roller and a sub discharge roller provided between the second discharge roller and the reverse roller.

19. The image forming apparatus according to claim 15, wherein the first discharge roller is provided between the print unit and the reverse roller to feed the printing medium fed from the print unit.

20. An image forming apparatus, comprising:
    a main body having a discharge tray provided at a front portion of the main body;
    a print unit to perform a printing operation on a printing medium, the print unit including a plurality of developing devices and a transfer belt arranged between the plurality of developing devices and a front panel of the main body;
    a first discharge roller to feed the printing medium fed from the print unit;
    a reverse roller to reverse a moving direction of the printing medium fed from the first discharge roller;
    a sensor disposed between the print unit and the reverse roller to sense the printing medium;
    a second discharge roller to discharge the printing medium fed from the reverse roller to the discharge tray of the main body;
    a first feeding path extending upward between the plurality of developing devices and the transfer belt, the first feeding path extending to be inclined toward a rear portion of the main body;
    a second feeding path connected to the first feeding path and extending toward the reverse roller; and
    a discharge path connected to the second feeding path to guide the printing medium reversed by the reverse roller toward the discharge tray, at least one portion of the discharge path disposed above the second feeding path such that the reversed printing medium is fed upward toward the discharge tray,
    wherein, in a duplex printing mode, after a printing operation is performed on a first side of a printing medium and a moving direction of the printing medium engaged by the reverse roller is reversed, the printing medium is fed to a duplex-print circulation path provided between the transfer belt and the front panel of the main body and configured to feed the printing medium to the print unit such that a printing operation is performed on a second side of the printing medium,
    wherein, in the duplex printing mode, after the printing operation is performed on the second side of the printing medium and the moving direction of the printing medium engaged by the reverse roller is reversed, the reversed printing medium is discharged to the discharge tray via the second discharge roller, and
    wherein the printing medium passing through the print unit is transferred toward a rear portion of the main body during a predetermined period of time after being sensed by the sensor, and the printing medium, after the predetermined period of time has elapsed, is reversed by the reverse roller, transferred to the front portion of the main body, and selectively guided to the discharge tray or the duplex-print circulation path.

21. The image forming apparatus according to claim 20, wherein the first discharge roller is provided between the print unit and the reverse roller to feed the printing medium fed from the print unit.

22. The image forming apparatus according to claim 20, wherein a rear end of the printing medium is sensed by the sensor.

23. An image forming apparatus, comprising:
    a main body having a discharge tray provided at a front portion of the main body;
    a print unit to perform a printing operation on a printing medium, the print unit including a plurality of developing devices and a transfer belt arranged between the plurality of developing devices and a front panel of the main body;
    a reverse roller provided at a rear portion of the main body to reverse a moving direction of the printing medium;
    a first discharge roller to feed the printing medium fed from the print unit in a direction from the front portion to the rear portion;
    a second discharge roller to discharge the printing medium fed from the reverse roller to the discharge tray of the main body in a direction from the rear portion to the front portion;

a first feeding path extending upward between the plurality of developing devices and the transfer belt, the first feeding path extending to be inclined toward a rear portion of the main body;

a second feeding path connected to the first feeding path and extending toward the reverse roller;

a discharge path connected to the second feeding path to guide the printing medium reversed by the reverse roller toward the discharge tray, at least one portion of the discharge path disposed above the second feeding path such that the reversed printing medium is fed upward toward the discharge tray; and a sensor disposed between the print unit and the reverse roller to sense a portion of the printing medium, wherein, in a duplex printing mode, after a printing operation is performed on a first side of a printing medium and a moving direction of the printing medium engaged by the reverse roller is reversed, the reversed printing medium is fed to a duplex-print circulation path provided between the transfer belt and the front panel of the main body and configured to feed the printing medium to the print unit to perform a printing operation on a second side of the printing medium, wherein, in the duplex printing mode, after the printing operation is performed on the second side of the printing medium and the moving direction of the printing medium engaged by the reverse roller is reversed, the reversed printing medium is discharged to the discharge tray via the second discharge roller, and wherein, in the duplex printing mode, when a predetermined time elapses after the sensor senses the portion of the printing medium, the moving direction of the printing medium is reversed by the reverse roller.

24. The image forming apparatus according to claim 23, wherein the first discharge roller is provided between the print unit and the reverse roller to feed the printing medium fed from the print unit.

25. The image forming apparatus according to claim 23, wherein the portion of the printing medium sensed by the sensor corresponds to a rear end of the printing medium.

* * * * *